(12) United States Patent
Cotilletta

(10) Patent No.: US 8,113,598 B1
(45) Date of Patent: Feb. 14, 2012

(54) COSMETIC VIDEO GRAPHIC MODULE

(76) Inventor: Joseph Cotilletta, Cresskill, NJ (US)

( * ) Notice: Subject to any disclaimer, the term of this patent is extended or adjusted under 35 U.S.C. 154(b) by 807 days.

(21) Appl. No.: 12/240,530

(22) Filed: Sep. 29, 2008

(51) Int. Cl.
*A47B 81/06* (2006.01)
(52) U.S. Cl. .......................................... 312/9.1; 312/7.1
(58) Field of Classification Search ................ 312/7.2, 312/9.1, 319.1, 319.2, 319.4; 345/84, 87, 345/88
See application file for complete search history.

(56) References Cited

U.S. PATENT DOCUMENTS

| 7,331,550 | B2 * | 2/2008 | Gillespie et al. | ............ 248/278.1 |
| 2004/0164212 | A1 * | 8/2004 | Gillespie et al. | ............ 248/278.1 |
| 2006/0082518 | A1 * | 4/2006 | Ram | ............................... 345/1.1 |

* cited by examiner

*Primary Examiner* — My-Chau T Tran
(74) *Attorney, Agent, or Firm* — Richard A. Joel, Esq.

(57) ABSTRACT

The present invention involves an LCD video module assembly which is mounted on the wall at mass market stores to display video content preloaded onto the unit memory. New video content is loaded onto an SD card and sent periodically to stores to insert into an SD card slot to overwrite the old content with new content which is retained even if the SD card is removed from the slot. The memory and the SD cards are encrypted with a security cod that can only play and transfer information with that specific code.

7 Claims, 3 Drawing Sheets

COSMETIC VIDEO GRAPHIC MODULE

This invention relates to an LCD video module which displays cosmetics and skincare products and is mounted on the walls of mass market stores to advertise said products to consumers.

The prior art includes Pat. Pub. 2003/0191688 by Prince, et al which relates to a means for providing variable consumer information at a retail display location. The publication discloses a retail system and a commercial provider system coupled to the internet to target in-store customers with customizable capabilities. U.S. Pat. No. 5,111,196 to Hunt discloses a stand-alone battery powered information module to display computer generated alphanumeric information on one or more liquid crystal displays particularly pricing and related information associated with a shelf item.

U.S. Pat. No. 6,783,198 to Rudd, et al discloses a display case for housing and supporting a display which includes a flat panel video. Other patents of interest include U.S. Pat. No. 7,369,110 to Moon and U.S. Pat. No. 7,295,264 to Kim.

This invention involves an LCD video module which is mounted on a unique bracket with an AC adapter. The bracket is designed to mount on uni-wall fixtures which are normally found in mass marketing stores and in particular in the cosmetic area of said stores. The LCD graphics module includes an LCD display which shows video content preloaded into the unit memory. New video content may be loaded onto an SD card and sent periodically to stores having the display to insert the card into an SD card slot. The new video content overrides the old content and is retained even if the SD card is removed from the slot. For security purposes, the memory and SD card are encrypted with a security code that can only play and transfer information with that specific code.

The cosmetic video graphic module of this invention has a two to three year shelf life at the store and this will be the first time that any cosmetic company which displays cosmetics and skin care on mass market walls has installed LCD video technology to advertise their cosmetic and skin care products to customers. The unit is readily installed with a metal bracket having downwardly extending hooks which attach to the wall. The module itself has brackets which attach to the metal wall bracket so that the display is positioned in a vertical position.

Accordingly, an object of this invention is to provide a new and improved LCD graphics module for in store advertising of products.

Another object of this invention is to provide a new and improved LCD display for point of purchase advertising of cosmetic products.

A further object of this invention is to provide a new and improved video module which is preloaded with video advertising content for in store advertising.

A more specific object of this invention is to provide a new and improved in store LCD advertising video module which includes an encrypted memory which receives information form an encrypted SD card periodically and may be readily mounted on a wall to display cosmetic and skincare products.

The above and other objects and advantages of the present invention may be more clearly seen when viewed in conjunction with the accompanying drawings wherein.

Figure 1:
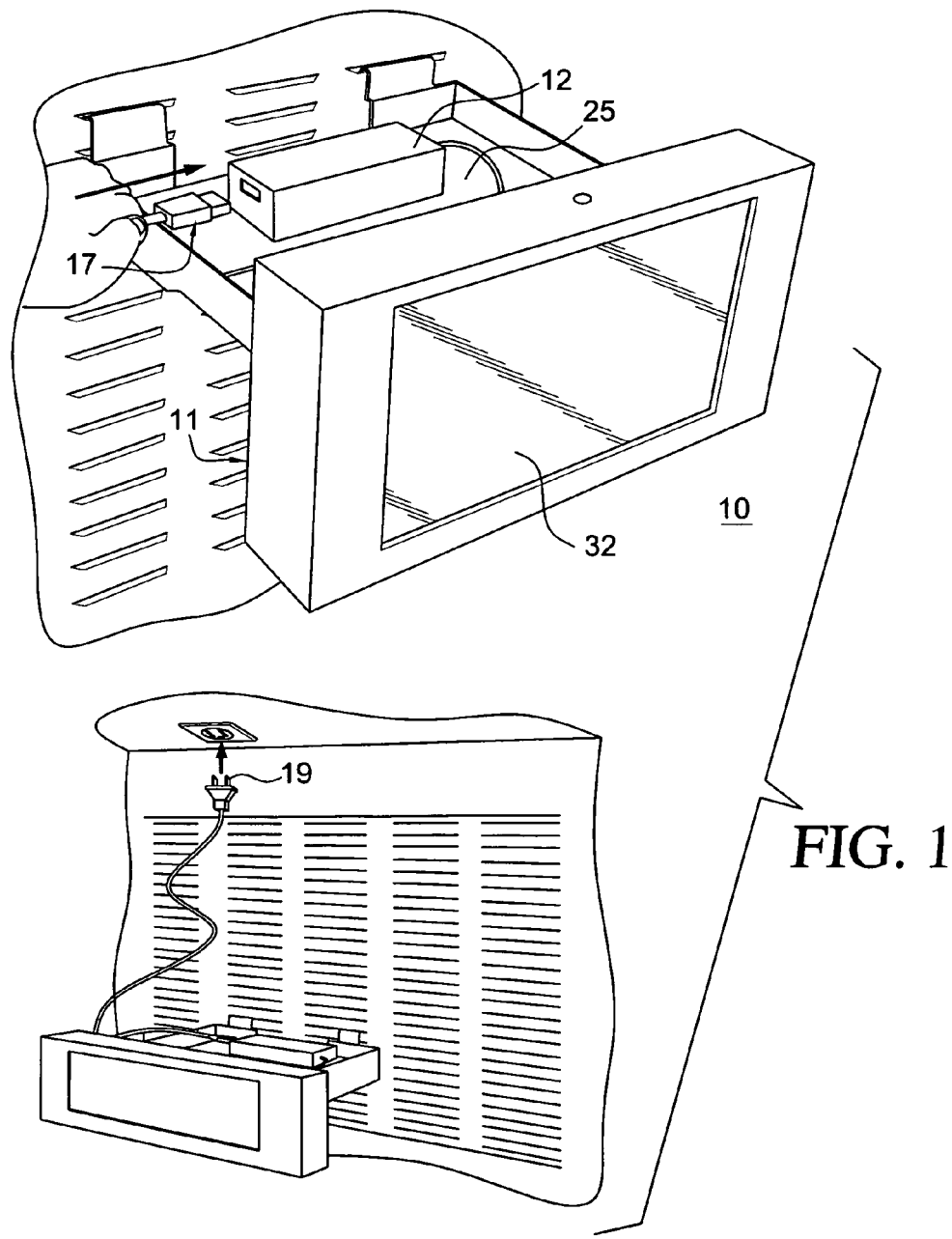
FIG. 1 is a perspective view of the display mounted with a bracket to a wall.
Figure 2:
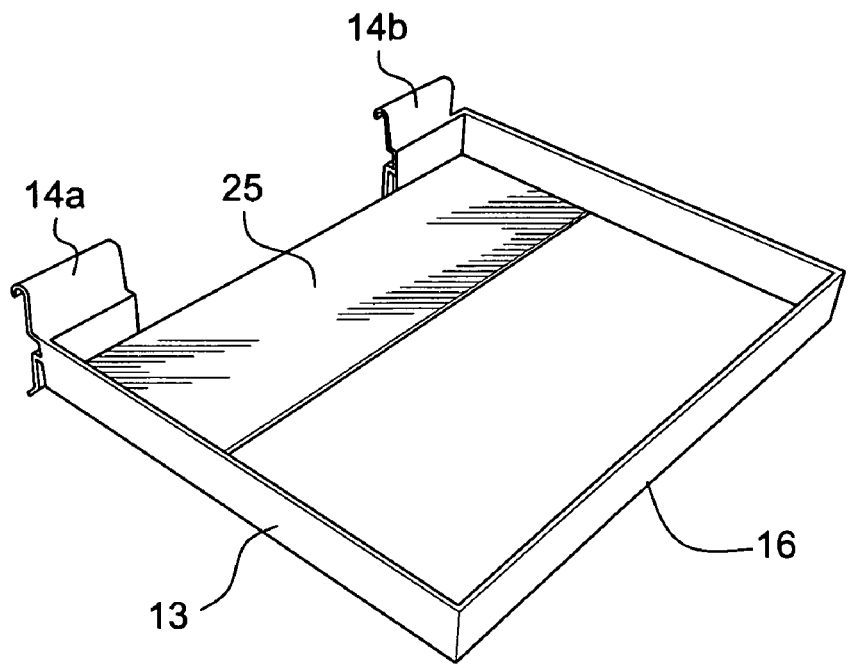
FIG. 2 shows the bracket for mounting to a wall.
Figure 3:
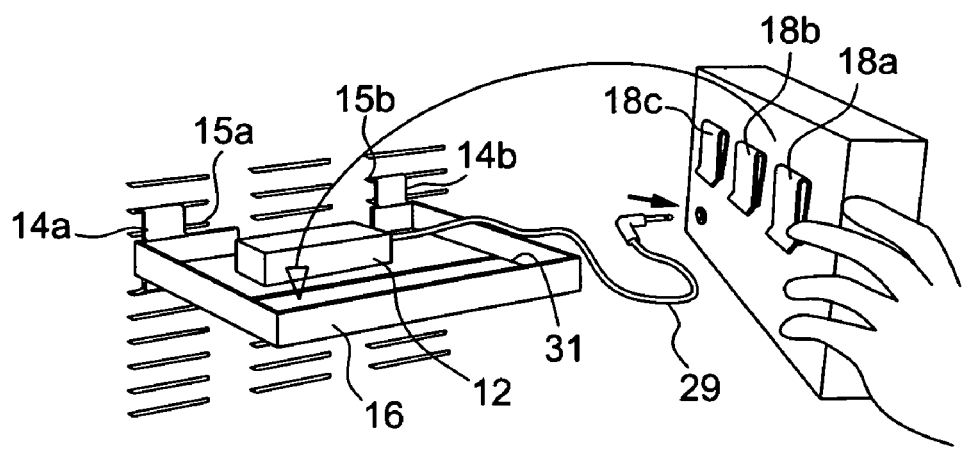
FIG. 3 shows the bracket and power adapter mounted to the wall prior to connecting to the LCD display; and, FIG. 4 is an exploded perspective view of the LCD display module.

Referring now to FIG. 1 of the drawings, the invention comprises an LCD display assembly 10 which is normally part of a 10.2 video graphic module 11, which is specifically designed for cosmetic displays at mass market stores such as Wal-Mart, Target and Rite Aid.

A typical video module has between five to ten minutes of video content preloaded onto the module memory when installed. The module 11 immediately plays when plugged in to an adapter 12 and includes a distinctly advantageous plug and play feature which appeals to advertising customers. After a period of time and with changing product lines, new video content can be loaded onto an SD card 20 and sent to the stores by the supplier to replace the old video with new updated video content. The SD card 20 will override the old content and immediately retain the new content even if the SD card 20 is taken out of the slot 21 which is enclosed behind pivotal hinge 22. This prevents tampering. It is to be noted that the memory is encrypted with a security code as well as the SD cards with the new content.

Figure 4:
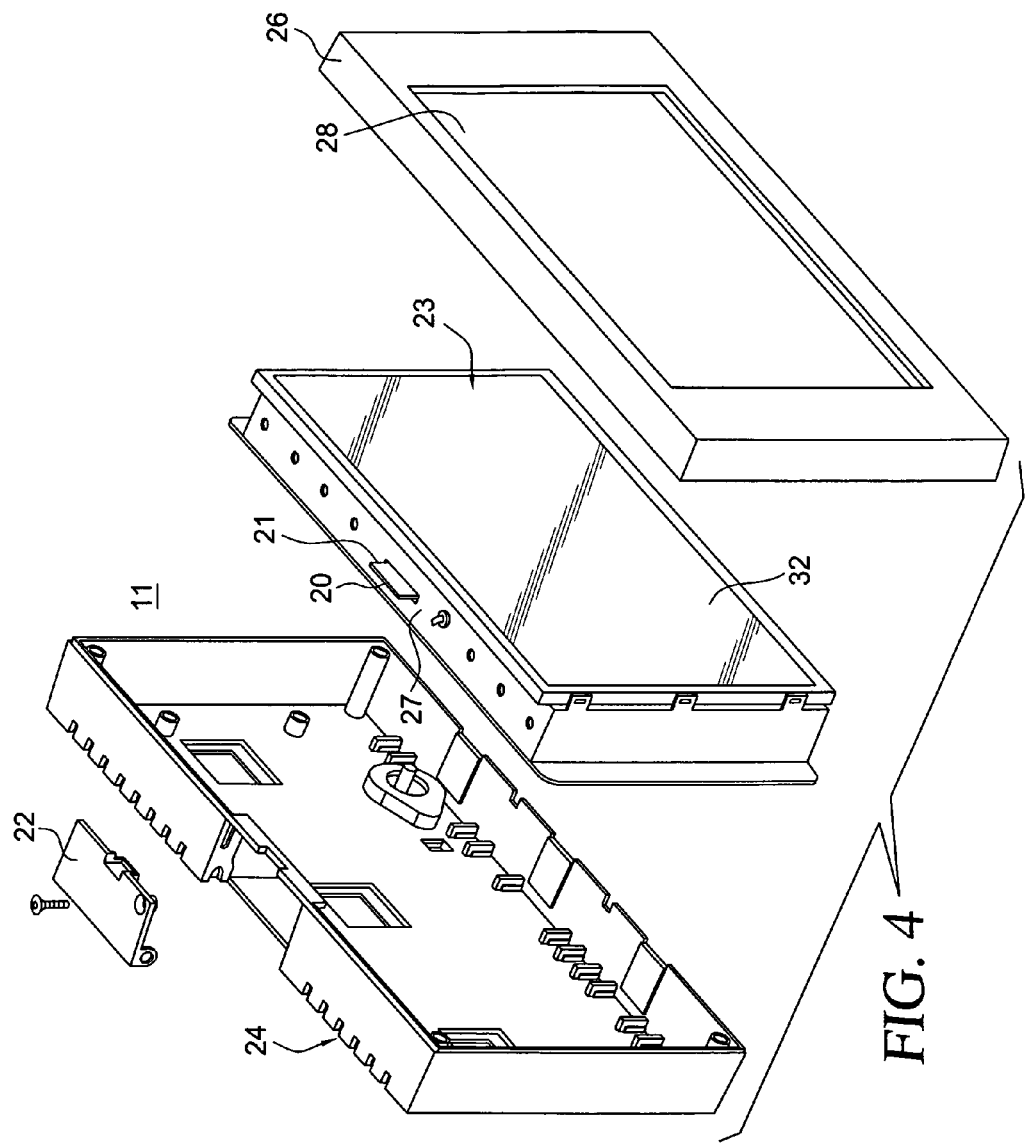

As shown in the exploded view of FIG. 4, the video display module 11 includes an outer bracket 24 a video display 23 and an outer frame 26 which are assembled together in the order shown. A hinged door 27 is provided on the frame 26 for insertion of the memory card 20 into the display 23. The bracket 24 includes a central aperture 28 for showing the display screen 32.

The module 11 can only play and transfer information with a specific code. This will prevent someone from trying to install unwanted graphic content. It is noted that the bracket 13 includes downwardly extending mounting members 14a, 14b at one end which fit into wall slots 15a, 15b and an outer portion having apertures 16 to which the display 10 is affixed in a vertical position for viewing purposes. The display module 11 includes a plurality of rear clips 18a-c for insertion into apertures 16 on the bracket 13.

The metal bracket 13 readily attaches to walls with the adaptor 12 mounted on pad 25 with Velcro®. The adapter 12 has a plug-in power cord 17 for engaging a power outlet 19 and the display module 11 with wire 29. The module 11 is molded in unbreakable ABS/poly-carbonate material and includes integral clips 18a-c which engages the bracket apertures 16 to secure the display assembly 10 in a vertical position.

The display 10 is easy to assemble and mount on a wall to exhibit products. It is also simple to change the content with a new SD card 20 and move the display 10 where needed.

In assembly, the bracket 13 is mounted to wall louvers 15a, 15b with downwardly extending hooks 14a, 14b. Tape is peeled back from the Velcro® strip on the adapter 12 and the adapter 12 is pressed on a mounting strip on the bracket surface 31. The three clips 18a-c on the back of the module 11 are slid onto a front rail 16 on the bracket 13. The power cord 17 is plugged into the AC adapter 12 and the power cord 17 is then plugged into a power source 19 to activate the LCD screen 32.

While the invention has been explained by a detailed description of certain specific embodiments, it is understood that various modifications and substitutions can be made in any of them within the scope of the appended claims that are intended also to include equivalents of such embodiments.

What is claimed is:

1. A wall mounted LCD video module assembly for in-store display of products comprises:
    an LCD display having memory, a screen and a slot, an SD card having video content loaded thereon for insertion into the slot to transfer the video content to the memory said memory and SD card being encrypted with a security code that can only play and transfer information with that specific code;

a bracket for mounting said display to a wall said display including clips on the rear thereof to hold said bracket in a substantially vertical position;

a power supply; and, an adapter having an output and input mounted on the bracket and connected to the display at its output and to the power supply at its input to activate the video module.

2. A wall mounted LCD video module assembly in accordance with claim 1 further including:

a plastic housing having the display mounted therein and a slot for an SD card extending through the housing to the display and coupled to the display to provide an input to the display and a hinged cover extending over the slot.

3. A wall mounted LCD video module assembly in accordance with claim 2 wherein:

the housing comprises an ABS/polycarbonate material.

4. A wall mounted LCD video module assembly in accordance with claim 1 wherein:

the bracket includes downwardly extending hooks to removably engage a wall and said wall having apertures and a horizontal rail to be engaged by the display, said display including downwardly extending clips to engage said rail on the bracket.

5. A method of displaying video advertising at a point-of-purchase cosmetic sales location comprising:

providing an LCD video display module and a bracket assembly;

mounting said module on the bracket and mounting said bracket on a wall;

encrypting a display program on the module;

providing an SD card which includes a display program to be inserted into the module, said card being encrypted with a program to activate the display and said program being transferred to the display even if the SD card is removed.

6. The method of claim 5 wherein:

the display includes clips for connecting the display to the bracket.

7. The method of claim 5 further including the step:

providing a bracket removably mounted on a wall and having a horizontal support surface for mounting an adapter thereon and mounting the display in a vertical position.

\* \* \* \* \*